US012558810B2

(12) United States Patent  
Murakami et al.

(10) Patent No.: US 12,558,810 B2  
(45) Date of Patent: Feb. 24, 2026

(54) METHOD FOR MANUFACTURING CERAMIC ARTICLE AND CERAMIC ARTICLE

(71) Applicant: CANON KABUSHIKI KAISHA, Tokyo (JP)

(72) Inventors: Shunsuke Murakami, Tokyo (JP); Yasushi Shimizu, Kanagawa (JP); Nobuhiro Yasui, Kanagawa (JP); Kanako Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 414 days.

(21) Appl. No.: 17/715,813

(22) Filed: Apr. 7, 2022

(65) Prior Publication Data

US 2022/0227021 A1 Jul. 21, 2022

Related U.S. Application Data

(63) Continuation of application No. PCT/JP2020/039565, filed on Oct. 21, 2020.

(30) Foreign Application Priority Data

Oct. 23, 2019 (JP) ................................ 2019-193067  
Oct. 16, 2020 (JP) ................................ 2020-174681

(51) Int. Cl.  
*B28B 1/00* (2006.01)  
*B33Y 10/00* (2015.01)  
(Continued)

(52) U.S. Cl.  
CPC .............. *B28B 1/001* (2013.01); *B33Y 10/00* (2014.12); *B33Y 40/20* (2020.01); *B33Y 70/00* (2014.12);  
(Continued)

(58) Field of Classification Search  
CPC ........ C04B 35/653; B33Y 10/00; B28B 1/001  
See application file for complete search history.

(56) References Cited

U.S. PATENT DOCUMENTS 4,190,450 A 2/1980 Robb  
5,298,470 A * 3/1994 Chia ..................... C04B 35/565  
501/92

(Continued)

FOREIGN PATENT DOCUMENTS

CN 102079653 A 6/2011  
CN 105254309 A 1/2016  
(Continued)

OTHER PUBLICATIONS

Stierlen—Si/SiC-ceramic prototypes via LS2I-process (liquid silicon infiltration of laser sintered C-SiC parts) 1999 (Year: 1999).*  
(Continued)

*Primary Examiner* — Alison L Hindenlang  
*Assistant Examiner* — Andres E. Behrens, Jr.  
(74) *Attorney, Agent, or Firm* — Canon U.S.A., Inc. IP Division

(57) ABSTRACT

(i) a step of disposing a powder that includes an absorber absorbing light of a wavelength included in a laser beam to be irradiated and silicon dioxide as a main component; (ii) a step of sintering or melting and solidifying the powder by irradiating the powder with a laser beam; and (iii) a step of heat-treating a shaped object formed by repeating the steps (i) and (ii) at 1470° C. or more and less than 1730° C.

28 Claims, 6 Drawing Sheets

(51) Int. Cl.

| | |
|---|---|
| *B33Y 40/20* | (2020.01) |
| *B33Y 70/00* | (2020.01) |
| *B33Y 80/00* | (2015.01) |
| *C04B 35/00* | (2006.01) |
| *C04B 35/16* | (2006.01) |
| *C04B 35/64* | (2006.01) |
| *C04B 35/653* | (2006.01) |
| *B32B 18/00* | (2006.01) |
| *B33Y 40/00* | (2020.01) |
| *C04B 41/00* | (2006.01) |
| *C04B 41/87* | (2006.01) |

(52) U.S. Cl.

CPC .............. *B33Y 80/00* (2014.12); *C04B 35/16* (2013.01); *C04B 35/64* (2013.01); *C04B 35/653* (2013.01); *B28B 1/00* (2013.01); *B32B 18/00* (2013.01); *B33Y 40/00* (2014.12); *C04B 35/00* (2013.01); *C04B 41/00* (2013.01); *C04B 41/009* (2013.01); *C04B 41/87* (2013.01); *C04B 2235/5409* (2013.01); *C04B 2235/5436* (2013.01); *C04B 2235/5445* (2013.01)

(56) References Cited

U.S. PATENT DOCUMENTS

| | | | | |
|---|---|---|---|---|
| 12,059,819 | B2 * | 8/2024 | Oshima | C04B 41/87 |
| 2006/0046920 | A1 * | 3/2006 | Odaka | C04B 35/565 |
| | | | | 264/643 |
| 2007/0105706 | A1 * | 5/2007 | Chen | C04B 41/009 |
| | | | | 501/87 |
| 2012/0237745 | A1 * | 9/2012 | Dierkes | C04B 35/4885 |
| | | | | 427/532 |
| 2015/0017475 | A1 * | 1/2015 | Ward-Close | B23K 20/02 |
| | | | | 228/101 |

| | | | | |
|---|---|---|---|---|
| 2016/0083303 | A1 | 3/2016 | Mironets | |
| 2016/0201222 | A1 | 7/2016 | Ikari | |
| 2016/0298213 | A1 * | 10/2016 | Yang | B33Y 70/00 |
| 2017/0312857 | A1 * | 11/2017 | Bourell | B22F 1/09 |
| 2018/0001557 | A1 * | 1/2018 | Buller | B22F 12/90 |
| 2019/0039134 | A1 * | 2/2019 | Vogel | B22F 3/1028 |
| 2019/0040503 | A1 * | 2/2019 | Martin | B23K 35/288 |
| 2019/0135705 | A1 * | 5/2019 | Yasui | B33Y 80/00 |
| 2019/0161835 | A1 * | 5/2019 | Martin | C22C 1/0416 |
| 2021/0031403 | A1 * | 2/2021 | Oshima | C04B 35/119 |
| 2022/0324019 | A1 * | 10/2022 | Kitani | C04B 35/653 |

FOREIGN PATENT DOCUMENTS

| | | | | | |
|---|---|---|---|---|---|
| EP | 3769924 | A1 | 1/2021 | | |
| EP | 3885089 | A1 | 9/2021 | | |
| JP | S62113781 | A | 5/1987 | | |
| JP | 2001017907 | A | 1/2001 | | |
| JP | 2013501701 | A | 1/2013 | | |
| JP | 2016204244 | A | 12/2016 | | |
| JP | 2019019051 | A | 2/2019 | | |
| JP | 2019188810 | A | 10/2019 | | |
| JP | 2020100141 | A | 7/2020 | | |
| WO | WO-2018157159 | A1 * | 8/2018 | ........... | B22F 3/1055 |
| WO | 2019013334 | A1 | 1/2019 | | |
| WO | 2019208570 | A1 | 10/2019 | | |
| WO | 2020129958 | A1 | 6/2020 | | |

OTHER PUBLICATIONS

Ricker et al. (TiO2-SiO2 Phase Diagram, 1952) https://ceramics.onlinelibrary.wiley.com/doi/epdf/10.1111/j.1151-2916.1951.tb09129.x (Year: 1952).*

Felsche, J. (1973). The crystal chemistry of the rare-earth silicates. In: Rare Earths. Structure and Bonding, vol. 13. Springer, Berlin, Heidelberg. https://doi.org/10.1007/3-540-06125-8_3 (Year: 1973).*

\* cited by examiner

A-COMPONENT                    B-COMPONENT

METHOD FOR MANUFACTURING CERAMIC ARTICLE AND CERAMIC ARTICLE

CROSS-REFERENCE TO RELATED APPLICATIONS

This application is a Continuation of International Patent Application No. PCT/JP2020/039565, filed Oct. 21, 2020, which claims the benefit of Japanese Patent Application No. 2019-193067 filed Oct. 23, 2019 and No. 2020-174681 filed Oct. 16, 2020, both of which are hereby incorporated by reference herein in their entirety.

TECHNICAL FIELD

The present invention relates to a method for manufacturing a silica-based ceramic article using an additive manufacturing technology and a ceramic article produced by the manufacturing method.

BACKGROUND ART

An additive manufacturing technology for obtaining a desired shaped object by adding a material based on three-dimensional data of a model as a manufacturing target is being widespread for applications in production of a prototype in a short time or manufacturing of a small number of an article. In manufacturing of metal articles, a direct molding system, in which a metal powder is solidified and molded by irradiating the powder with laser light based on the three-dimensional data of a model, is widely employed. According to this method, it is possible to obtain precise and diverse articles by effectively melting and solidifying a metal powder.

In recent years, efforts for establishing an additive manufacturing technology using a ceramic powder as a raw material is being performed. However, general-purpose ceramics, such as aluminum oxide and zirconium oxide, have a low ability of absorbing laser light, unlike metals. Accordingly, in order to melt a ceramic powder, although it is necessary to use a large amount of energy, laser light diffuses to make the melting ununiform, resulting in difficulty of obtaining required molding accuracy.

Accordingly, PTL 1 discloses a technology for producing a shaped object with high accuracy by preventing diffusion of light through addition of an absorber that absorbs laser light to a raw material powder.

Among ceramics, a silica-based material is widely used as a material for constituting a casting core. The casting core is a mold to be embedded in a portion corresponding to the hollow of a die when a cast having a hollow inside is made and is eventually removed from the cast article. Since the core is required to have excellent heat resistance without causing a chemical change with a molten metal to be cast and to be easily removed at the end of the casting process, silica-based structures that are soluble in alkali solutions are suitable as casting cores. Here, "silica-based" means that silicon dioxide is the main component. In the present invention, the term "main component" refers to a component (element or compound) that is most contained in the mass ratio.

If a casting core can be produced by an additive manufacturing technology, it is possible to achieve casting of a complicated shape with low cost. Since the accuracy of the size or surface of a cast article is affected by the size and the surface state of the core, the silica-based shaped object to be used as a core is required to have a high molding accuracy and a high mechanical strength that can withstand the casting process.

PTL 1 describes a silica-based material as a molding powder to be used in a direct molding system. However, the silica-based material has a high viscosity in a liquid phase and therefore becomes spherical in a melted state by irradiation with laser light, and the solidified portion tends to be porous. In addition, since the melted part after passage of the laser light is rapidly cooled at a high temperature lowering rate, the solidified portion is mostly amorphous. Even in the case of causing liquid phase sintering by laser irradiation, the portion of a liquid phase is rapidly cooled after passage of the laser light and becomes amorphous. Due to these reasons, the silica-based shaped object molded by the method disclosed in PTL 1 has excellent molding accuracy, but since there are a large amount of amorphous parts, the mechanical strength may be insufficient for some applications, such as a casting core.

CITATION LIST

Patent Literature

PTL 1 Japanese Patent Laid-Open No. 2019-19051

SUMMARY OF INVENTION

The present invention has been made for solving the above problems and provides a technology for manufacturing a silica-based ceramic article having a high molding accuracy and an excellent mechanical strength by using a direct molding system.

The method for manufacturing a ceramic article according to the present invention is characterized in including:

- (i) a step of disposing a powder that contains an absorber absorbing light of a predetermined wavelength and silicon dioxide as a main component;
- (ii) a step of sintering or melting and solidifying the powder by irradiating the powder with laser including light having the predetermined wavelength; and
- (iii) a step of heating a shaped object formed by repeating the steps (i) and (ii) at 1470° C. or more and less than 1730° C.

In addition, the ceramic article according to the present invention is a ceramic article that contains Tb or Pr and silicon dioxide as a main component and is characterized in that the content of silicon is higher than 80 mass % and that 70 mass % or more of the silicon dioxide is cristobalite.

Further features of the present invention will become apparent from the following description of exemplary embodiments with reference to the attached drawings.

DESCRIPTION OF EMBODIMENTS

The method for manufacturing a ceramic article according to the present invention includes the following steps:

(i) a step of disposing a powder that contains an absorber absorbing light of a predetermined wavelength and silicon dioxide as a main component;

(ii) a step of sintering or melting and solidifying the powder by irradiating the powder with laser including light having the predetermined wavelength; and (iii) a step of heating a shaped object formed by repeating the steps (i) and (ii) at 1470° C. or more and less than 1730° C.

Embodiments of the present invention will now be described by examples with reference to the drawings, but the present invention is not limited to the following examples and drawings, and modification within the scope of the technical idea of the present invention is possible.

The present invention is suitably used in a powder bed fusion system and a directional energy lamination system (so-called cladding system) in which a molding material is deposited so as to be overlaid while melting, among direct molding systems. Application of the present invention can largely improve the mechanical strength of the resulting silica-based shaped object, while achieving good molding accuracy.

Incidentally, the silica means silicon dioxide. Silica has polymorphs, but the state, such as amorphous, crystalline, and a crystal structure, does not matter. The term "polymorph" refers to it can exist in multiple different crystalline forms despite having the same chemical composition.

A flow of basic molding of a powder bed fusion system will be described using FIGS. 1A to 1H.

Figure 1A:
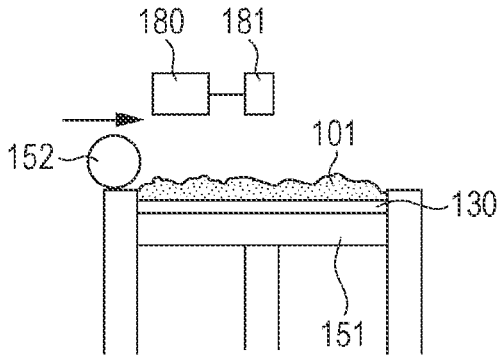
FIG. 1A is a schematic cross-sectional view schematically illustrating an embodiment of the method for manufacturing a shaped object by a powder bed fusion system.
Figure 1B:
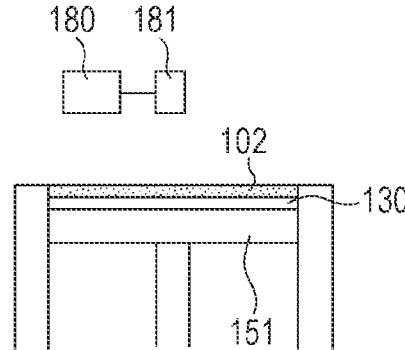
FIG. 1B is a schematic cross-sectional view schematically illustrating an embodiment of the method for manufacturing a shaped object by a powder bed fusion system.
Figure 1C:
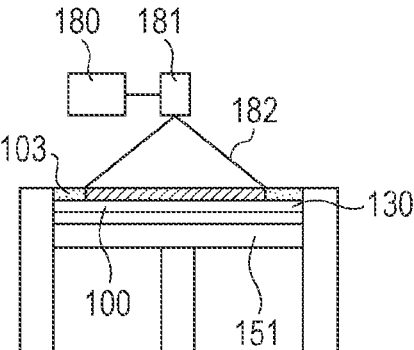
FIG. 1C is a schematic cross-sectional view schematically illustrating an embodiment of the method for manufacturing a shaped object by a powder bed fusion system.

First, a powder 101 is placed on a base 130 mounted on a stage 151, and a powder (powder layer) 102 having a predetermined thickness is disposed using a roller 152 (FIGS. 1A and 1B). The surface of the powder layer 102 is irradiated with a laser beam emitted from a laser beam source 180 based on molding data (slice data) generated from three-dimensional shape data of a model having a desired shape while scanning with a scanner 181. In the laser beam irradiation area 182, the powder is sintered or melted and solidified to form a solidified portion 100 (FIG. 1C). Subsequently, the stage 151 is lowered, and a new powder layer 102 is formed on the solidified portion 100 (FIG. 1D) and is irradiated with a laser beam based on molding data. These series of steps are repeated to form a shaped object 110 having a desired shape (FIGS. 1E and 1F). Finally, the unsolidified powder 103 is removed, and removal of the unnecessary portion of the shaped object and separation between the shaped object and the base are performed as needed to obtain a shaped object (FIGS. 1G and 1H).

Figure 2A:
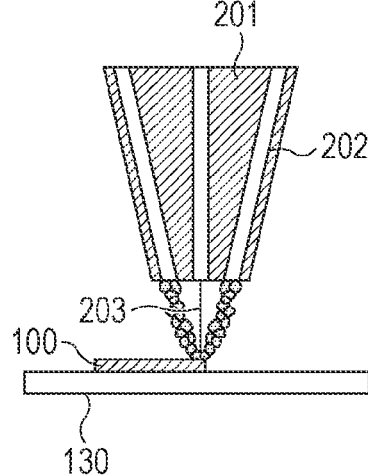
FIG. 2A is a schematic cross-sectional view schematically illustrating an embodiment of the method for manufacturing a shaped object by a cladding system.
Figure 2B:
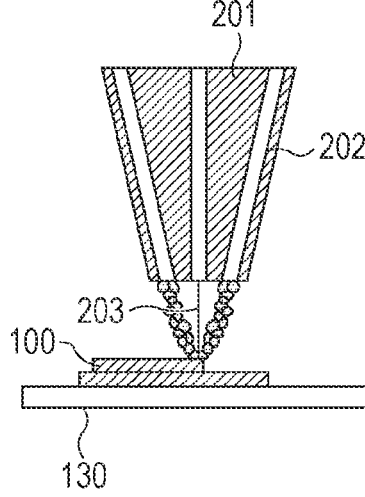
FIG. 2B is a schematic cross-sectional view schematically illustrating an embodiment of the method for manufacturing a shaped object by a cladding system.
Figure 2C:
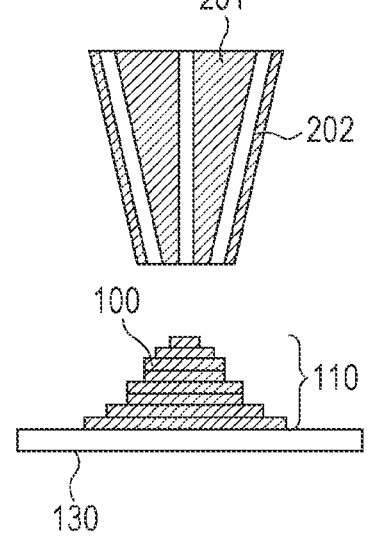
FIG. 2C is a schematic cross-sectional view schematically illustrating an embodiment of the method for manufacturing a shaped object by a cladding system.

The cladding system will be then described using FIGS. 2A to 2C. A powder is ejected from a plurality of powder supply holes 202 of a cladding nozzle 201 while irradiating the region on which the powder focuses with a laser beam 203 to incrementally form a solidified portion 100 at a desired position based on molding data (FIG. 2A). This process is continuously performed to obtain a shaped object 110 having a desired shape (FIGS. 2B and 2C). Finally, removal of the unnecessary portion of the shaped object and separation between the shaped object and the base are performed as needed.

In a direct molding system such as a powder bed direct molding system and a cladding system, a powder of which the main component is silicon dioxide melted by laser beam irradiation is solidified by rapid cooling from the circumference, and a solidified product mainly composed of amorphous silica is formed. The shaped object mainly composed of amorphous silica formed by such a melting and solidification process has a low density and thereby cannot have a high mechanical strength.

One of the crystalline forms that silica can take is cristobalite. Cristobalite is a crystalline form that is stable at high temperature and therefore can maintain a stable state at high temperature exposed during casting. Furthermore, since the density is high compared to that of silica in an amorphous structure, the mechanical strength at high temperature is also excellent. Since the solubility of cristobalite in alkaline solution is high compared to those of other crystalline forms, such as quartz, cristobalite is suitable as a crystalline form constituting a casting core.

Accordingly, in the present invention, the shaped object produced by repeating steps (i) and (ii) is treated with heat of 1470° C. or more and less than 1730° C. Such heating treatment realizes a shaped object that is stable at high temperature and has an excellent mechanical strength. It is inferred that this is because the heating treatment changes the shaped object mainly made of amorphous silica immediately after molding to cristobalite in which 70 mass % or more of silicon contained in the shaped object is bonding with oxygen.

In addition, since the area irradiated with a laser beam is exposed to the melting temperature and the solidification temperature within a short time depending on the conditions for performing steps (i) and (ii), a large number of cracks are formed in the obtained shaped object by the thermal stress in some cases. The cracks are distributed in the whole shaped object, i.e., the surface and the inside. When a cross section of the shaped object is verified with a scanning electron microscopy or the like, in many of the cracks, the width is several nanometers to several micrometers, and the length varies from several micrometers to several millimeters. If a large number of such cracks are formed in the shaped object, the mechanical strength is decreased.

When a decrease in the mechanical strength due to cracks is concerned, it is preferable to allow the cracks of the shaped object to absorb a metal component-containing liquid before the heating treatment in step (iii). The heating changes the amorphous silica contained in the shaped object to cristobalite having a higher mechanical strength and simultaneously repairs the cracks by melting selectively the vicinities of the cracks by the action of the metal component-containing liquid to reduce the cracks in the shaped object. As a result, the mechanical strength of the shaped object can be remarkably improved.

The metal component-containing liquid to be absorbed by cracks is preferably a liquid that can supply a metal oxide to the cracks. For example, the metal component-containing liquid is preferably one containing a metal oxide or one containing a component that generates a metal oxide by heating treatment that is performed after absorption of the metal component-containing liquid. The metal component-containing liquid is preferably a composition that can independently supply a metal oxide, but may be a composition that generates a metal oxide by compounding, solid solution, or diffusion with a component included in the shaped object.

As the metal component-containing liquid, for example, a solution, sol-liquid, or particle dispersion containing a metallic element can be used. The metal component-containing liquid may be any liquid as long as the characteristics, such as the viscosity and the concentration, of the liquid are adjusted such that the metallic element spreads all over the entire shaped object when the metal component-containing liquid is absorbed by the shaped object in step (iii). The metallic element is contained in the metal component-containing liquid in the form of, for example, a metal salt, a metal alkoxide, or a particle containing the metallic element. Examples of the particle containing the metallic element include particles of a metal, an oxide, a nitride, a carbide, a boride, and a hydroxide. The particle dispersion contains, in addition to the particle, for example, a solvent, a dispersant, and a stabilizer. Examples of the solvent include water, an organic solvent, and oils. Examples of the dispersant include a pH adjuster, a silane coupling agent, and a surfactant. Examples of the stabilizer include a pH adjuster, a surfactant, a chelating agent, and a self-decomposition retardant. However, examples are not limited to the above.

When a particle dispersion in which particles containing a metallic element are dispersed in a solvent is used as the metal component-containing liquid, in order to allow the dispersion to spread all over the cracks in the shaped object, the particles preferably have a diameter sufficiently smaller than the width of the cracks. It is thought that the strength of a shaped object is highly affected by cracks having a width of 1 μm or more. In order to allow the particles to penetrate into cracks having a width of 1 μm or more, the average particle diameter of the particles is preferably 300 nm or less, more preferably 50 nm or less, and further preferably 30 nm or less. The metal component-containing liquid dispersing the particles is easy to adjust the concentration of the metallic element by a method of, for example, adjusting the composition of the particles or the content of the particles, and a liquid containing a high concentration of the metallic element can be produced. The time necessary for the step of allowing the shaped object to absorb the metal component-containing liquid and performing heating treatment can be shortened by using the liquid containing a high concentration of the metallic element as the metal component-containing liquid. That is, cracks can be repaired by a small number of times of the absorption and heating treatment processes.

On the other hand, when a solution or sol liquid containing a metallic element is used, since the metallic element spreads even to minute cracks, it is possible to repair finer cracks compared to the use of a particle dispersion. However, since it is difficult to produce a liquid containing a high concentration of a metallic element, the time necessary for repairing cracks tends to be long compared to the case of using a particle dispersion.

The metal component-containing liquid is preferably one that generates a phase that can form a eutectic with the phase that constitutes the shaped object by heating. When the shaped object includes a plurality of phases, it suffices to form a phase that can form a eutectic with any of the phases included in the shaped object. When the phase formed from the metal component-containing liquid by heating treatment is a metal oxide and when this metal oxide phase and the phase included in the shaped object are in a relationship capable of forming a eutectic, the vicinity of a crack into which a metallic component has penetrated melts at a temperature lower than the melting point of other portions of the shaped object. The metallic element or the metal oxide then diffuses into the shaped object with time, and crystals recrystallize with a composition including the metallic element in the shaped object with a decrease in temperature after the heating. As a result, only the vicinity regions of cracks are softened while maintaining the shape of the shaped object, and an effect of reducing or extinguishing the cracks can be obtained.

When a component A and another component B can form a eutectic, it may be expressed as "a component A and a component B are in a eutectic relationship". A eutectic is a mixture of two or more types of crystals that simultaneously crystallize out from a liquid phase including two or more components. The phrase "a component A and a component B can form a eutectic" is synonymous with the phrase "a component A and a component B have a eutectic state". In the case of having a eutectic state, a eutectic point is present. The eutectic point is the temperature at which a eutectic occurs and corresponds to the minimum value of a liquid phase curve in a phase diagram represented by temperature on the vertical axis and component composition ratio on the horizontal axis. The composition corresponding to the eutectic point is called a eutectic composition. Accordingly, the eutectic point of a component A and a component B is lower than those of the component A and the component B.

A compound component included in a shaped object that is allowed to absorb a metal component-containing liquid is defined as component A, and an oxide of a metallic element included in the metal component-containing liquid is defined as component B. When the component A and the component B are assumed to have a relationship of a eutectic state, it is inferred that regional melting caused by a crack is due to the following phenomena.

When a shaped object is allowed to absorb a metal component-containing liquid, a metal oxide or a metal element contained in the liquid is present in the surface of the shaped object having cracks. If heating is performed in this state, the metallic element changes to a metal oxide. Consequently, component B is present in the surface of the shaped object having cracks regardless of whether the metal component-containing liquid includes the metal oxide or the metallic element. If heat is further applied in this state, it is inferred that in the vicinity of the region where the component B is present in the surface of the shaped object, the component A melts in an amount corresponding to the amount of the component B for forming a eutectic composition or a composition similar to a eutectic composition at a temperature lower than the melting point of the shaped object and recrystallizes to contribute to repairing cracks. That is, it is inferred that since the component A melts in an amount corresponding to the amount of the component B present in the cracks, only the vicinity regions of cracks are softened to provide an effect of reducing or extinguishing the cracks is obtained while maintaining the shape of the shaped object.

The amount of the component B in the surface of the shaped object having the cracks of the shaped object can be controlled by adjusting the number of times of allowing the cracks to absorb the metal component-containing liquid and the concentration of the metallic element included in the metal component-containing liquid. In the vicinity of the region where the component B is present, the component A melts in an amount corresponding to the amount of the component B, giving a composition ratio of a eutectic composition or a composition similar to a eutectic composition, at a temperature lower than the melting point of the shaped object. A larger amount of the component B enables the repair the cracks in a broader area.

Figure 3:
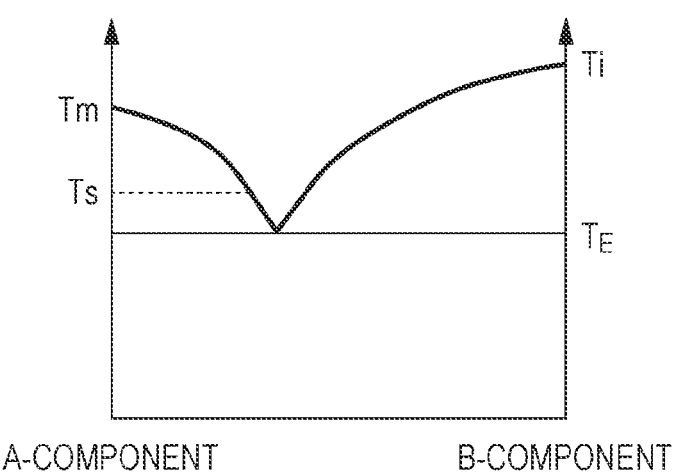
FIG. 3 is a phase diagram representing a relationship between the composition ratio and state of A-component and B-component that can become eutectic.

In order to melt the vicinities of cracks, the temperature of the heating treatment that is performed after absorption of the metal component-containing liquid by the shaped object is also important. FIG. 3 shows a phase diagram when the component A as a component contained in the shaped object and the component B (metal oxide) formed from the metal component-containing liquid are a combination that can form a eutectic. The horizontal axis shows the composition ratio of the component A and the component B, and the vertical axis shows the state of each composition.

When the melting point of component A is denoted by $T_m$, the melting point of component B is denoted by $T_i$, and the eutectic temperature of the component A and the component B is denoted by $T_E$, these temperatures satisfy relationships of $T_E < T_m$ and $T_E < T_i$. In this case, it is preferable to set the maximum temperature $T_S$ to which the shaped object reaches by heating treatment performed after absorption of the metal component-containing liquid to satisfy $T_E \leq T_S < T_m$, more preferably $T_E \leq T_S < T_m - (T_m - T_E)/2$. Consequently, cracks can be reduced or extinguished by selectively melting the vicinities of the cracks at a temperature lower than the melting point $T_m$ of the shaped object, and the shape of the shaped object is likely to be maintained.

Since the technical idea of the present invention is for improving the mechanical strength by generating cristobalite in the shaped object, it is necessary that the maximum temperature $T_S$ in heating for repairing cracks is 1470° C. or more and 1730° C. or less which is the temperature range for generating cristobalite in the shaped object. Therefore, it is important to appropriately select the combination of the component A included in the shaped object and the metal component-containing liquid.

According to the composition of the metal component-containing liquid to be used, cracks can be further reduced or extinguished by repeating the treatment of heating multiple times after absorption of the metal component-containing liquid. When a combination in which the melting points of the components A and B satisfy a relationship of $T_m < T_i$ is selected, a high effect can be obtained by a relatively small number of times. This is because, as shown in FIG. 3, when $T_m < T_i$, since the component A and the component B in a composition including the component A in a high ratio form a eutectic, the vicinities of cracks can be melted at the eutectic temperature in a state in which the rate of the component B included in the metal component-containing liquid is low. Incidentally, the condition of $T_m < T_i$ is not essential.

Considering the above, when the main component of the shaped object is silicon dioxide ($SiO_2$; melting point $T_m = 1730°$ C.), the metal component-containing liquid is preferably a liquid containing aluminum (aluminum component-containing liquid). Most of the aluminum element included in the aluminum component-containing liquid becomes alumina ($Al_2O_3$; melting point $T_i = 2070°$ C.) by heating. The eutectic temperature $T_E$ of $SiO_2$ and $Al_2O_3$ is 1595° C. Since $SiO_2$ and $Al_2O_3$ correspond to the component A and the component B, respectively, a relationship of $T_m < T_i$ is satisfied. The temperature $T_S$ for heating treatment that is performed after allowing the shaped object of which the main component is silicon dioxide to absorb the aluminum component-containing liquid can be set in a range of 1595° C. or more and less than 1730° C. that allows the generation of cristobalite in the shaped object. The $T_S$ is more preferably set in a range of 1595° C. or more and 1663° C. or less.

Thus, in the case of a shaped object of which the main component is silicon dioxide, cracks can be reduced or extinguished by allowing the cracks to absorb the aluminum component-containing liquid, even if the heating treatment is performed at a temperature 100° C. or more lower than the melting point of $SiO_2$. Thus, a shaped object having an improved mechanical strength can be obtained by heating treatment at a temperature sufficiently lower than the melting point of $SiO_2$ as the main component of the shaped object while preventing a change in the shape of the shaped object.

Even in the case of using a liquid containing a zirconium element (zirconium component-containing liquid) as the metal component-containing liquid, the component A and the component B are $SiO_2$ (melting point $T_{mi} = 1730°$ C.) and $ZrO_2$ (melting point $T_i = 2715°$ C.), respectively, and satisfy a relationship of $T_m < T_i$.

As described above, a silica-based ceramic article having an excellent mechanical strength can be obtained by allowing cracks of a shaped object mainly made of amorphous silica produced by a direct molding system to absorb a metal component that forms a eutectic with silica and performing heating treatment at an appropriate temperature.

Incidentally, even if a powder itself contains the metallic element to be used for repairing cracks, the effect of reducing cracks of a shaped object is not obtained. If the powder to be used for molding includes a certain amount or more of a metallic element to be used for repairing cracks, the metallic element to be used for repairment of cracks is included in the entire shaped object, and the melting point of the vicinities of cracks cannot be regionally decreased by absorbing the metal component-containing liquid. And also the whole shaped object is melted by heating, resulting in a risk of deformation of the shaped object. That is, in order to repair cracks without reducing the molding accuracy of a shaped object, it is important to perform heating treatment in a state in which the concentration of the metallic element in the vicinities of cracks generated in the produced shaped object is regionally increased.

In order to melt regionally only the vicinities of cracks by allowing the cracks to absorb the metal component-containing liquid after molding, the powder preferably does not include 3.0 mass % or more of an oxide of the metallic element contained in the metal component-containing liquid. That is, when the molding powder includes the metallic element that is included in the metal component-containing liquid, the content thereof is preferably less than 3.0 mass %, further preferably less than 2.0 mass %, of the entire powder. By using a combination of such a powder and a metal component-containing liquid, an article having a high molding accuracy and an improved mechanical strength can be realized.

Subsequently, three steps included in the method for manufacturing a ceramic article according to the present invention will be described in detail.

Step (i)

A powder including an absorber that absorbs light having a wavelength which is included in the laser to be irradiated and silicon dioxide as a main component is disposed on a base. The absorber can be selected according to the type of the laser to be used, and terbium oxide or praseodymium oxide is particularly preferable.

Silicon dioxide (silica) is represented by a chemical formula: $SiO_2$. The bonding state between atoms of $SiO_2$ contained in a powder is not particularly limited and may be amorphous or in a crystalline state, such as cristobalite and quartz, or may be a mixture thereof. In particular, a powder of which the main component is cristobalite having high thermal conductivity is likely to melt by laser irradiation and is therefore particularly preferable. Since the powder is densely disposed in step (i), the $SiO_2$ particles constituting the $SiO_2$ powder as the main component preferably have a shape close to a sphere giving high fluidity and preferably have an average particle diameter of 5 μm or more and 200 μm or less. A more preferable average particle diameter is 10 μm or more and 150 μm or less. In the present invention, the average particle diameter is not that of individual particles, but is the central value of diameters of particles in a group having the same composition, that is, the particle diameter (D50) at which the cumulative frequency is 50%. The measurement procedure of the average particle diameter is not particularly limited, and the average particle diameter can be calculated as an equivalent circle diameter of a projection image from a micrograph of a fine particle powder or can be determined using a dynamic light scattering method.

The powder of which the main component is silicon dioxide includes an absorber as a subcomponent. The term "absorber" herein refers to a component (element or compound) showing an absorbing ability higher than that of silicon dioxide for the light having a wavelength included in the laser light to be used for molding. The absorbing ability of the absorber is preferably an absorption rate of 10% or more, more preferably 40% or more, and further preferably 60% or more for the light of a wavelength included in the laser beam used. The absorption rate of a single absorber can be measured using a general spectroscope. Specifically, the absorption is measured using an integrating sphere and irradiating a single absorber filled in a sample plate with an assumed wavelength (close to the laser wavelength to be used in manufacturing). The absorption when the sample is not present is measured as reference data, and the absorption rate may be calculated from the rate thereof.

Such absorber efficiently absorbs the laser light used in manufacturing to increase the temperature of itself, which extends to other compositions present in the region corresponding to the focal point size of the laser light to cause an increase in the temperature. Consequently, effective regional heating is achieved, the interface between the processing region (the region irradiated with laser light) and the non-processing region (the region not irradiated with laser light) can be clarified, and the molding accuracy is improved.

The absorber is preferably one that at least partially changes to another composition showing relatively low absorption by irradiation with laser. Examples thereof include a composition in which the metallic element changes the valence by desorption of oxygen with an increase in temperature to another metal oxide showing relatively low absorption for laser light. Alternatively, the absorber may be a composition that changes to a composition different from that in the powder state and incorporated into the shaped object by partial bonding with a gas in the atmosphere or another composition included in the powder or decomposition such as desorption of oxygen. Examples of the absorber includes an oxide, a transition metal carbide, a transition metal nitride, $Si_3N_4$, AlN, a boride, and a silicide. Compositions suitable as the absorber are $Tb_4O_7$, $Pr_6O_{11}$, $Ti_2O_3$, TiO, SiO, ZnO, antimony-doped tin oxide (ATO), indium-doped tin oxide (ITO), MnO, $MnO_2$, $Mn_2O_3$, $Mn_3O_4$, FeO, $Fe_2O_3$, $Fe_3O_4$, $Cu_2O$, CuO, $Cr_2O_3$, $CrO_3$, NiO, $V_2O_3$, $VO_2$, $V_2O_5$, $V_2O_4$, $Co_3O_4$, and CoO a transition metal carbide, a transition metal nitride, $Si_3N_4$, AlN, a boride, and a silicide. The transition metal carbide is preferably TiC or ZrC. The transition metal nitride is preferably TiN or ZrN. The boride is preferably $TiB_2$, $ZrB_2$, $LaB_6$. The silicide is preferably $TiSi_2$, $ZrSi_2$, or $MoSi_2$. A composition having high affinity to another composition constituting the powder may be selected from these compositions as the absorber. Since the powder is silicon dioxide, a metal oxide is preferable as the absorber. In the viewpoint of the highest affinity to silicon dioxide, SiO is preferable as the absorber. Incidentally, the absorber may be a single composition or may be a combination of two or more compositions.

The absorber showing good energy absorption for a laser beam is preferably dispersed finely and uniformly in the powder. Consequently, the reaction occurs uniformly in the powder when irradiated with a laser beam, resulting in a further improvement in the molding accuracy. From such viewpoint, the average particle diameter of the absorber included in the powder is preferably 1 μm or more and less than 10 μm and more preferably 1 μm or more and less than 5 μm.

The amount of the absorber included in the powder is preferably 0.5 vol % or more and 10 vol % or less. When the amount is 0.5 vol % or more, stochastically, one or more absorber particles are present in the laser beam irradiation area in general conditions for using a laser beam, and the function as an absorber can be sufficiently achieved. Furthermore, when the amount is 10 vol % or less, a sharp increase in temperature of the powder due to laser beam irradiation can be prevented, and scattering of the melted material to the circumference, i.e., a reduction in molding accuracy can be prevented.

When a Nd:YAG laser or a fiber laser is used as the laser used for molding, terbium oxide ($Tb_4O_7$) or praseodymium oxide ($Pr_6O_{11}$) capable of forming a eutectic with silicon dioxide is particularly preferable as the absorber from the following two reasons. A first reason is that terbium oxide and praseodymium oxide shows good energy absorption for a Nd:YAG laser (wavelength: 1064 nm) or a fiber laser (wavelength: 1030 to 1100 nm). When the powder used for molding includes an absorber that has sufficient energy absorption for the powder irradiated with a laser beam, spreading of heat in the powder is further prevented and becomes regional, and the influence of heat on the non-molding portion can be reduced, resulting in a further improvement in the molding accuracy.

A second reason is that if the powder contains terbium oxide or praseodymium oxide, a phase-separated structure in which two or more types of phases are intricately inter-twined with each other is formed in a network formed from silica. As described above, since the silica-based material has a high viscosity in a liquid phase, silica melted into a liquid state by irradiation with a laser beam becomes spheri-cal, and the solidified portion is likely to become a structure in which spheres are connected in a network shape, i.e., porous. However, when the powder includes terbium oxide or praseodymium oxide, a phase-separated structure in which the network of silica phase and the phase including terbium oxide or praseodymium oxide are intricately inter-twined with each other is formed to prevent extension of cracks, resulting in an improvement in the mechanical strength of the shaped object. In order to also obtain a minute phase-separated structure, the particle diameters of terbium oxide and praseodymium oxide are preferably 1 μm or more and less than 10 μm, more preferably 1 μm or more and less than 5 μm. Consequently, a shaped object having a further high mechanical strength is obtained.

In order to adjust the physical properties of the produced ceramic article, the powder may include a composition other than silicon dioxide and the absorber in a rate of less than 10 mass %.

Incidentally, in the present specification, although a mate-rial may be expressed by a chemical formula as in the above $SiO_2$ and $Tb_4O_7$, it is not necessary that the constituent element ratio of an actual material strictly coincides with the ratio of the chemical formula as long as the gist of the present invention is satisfied. That is, the valence of a metallic element constituting a material may be slightly different from the valence expected from the chemical formula. For example, when the absorber is SiO, even if the constituent element ratio of the absorber, Si:O, is 1:1.30, such a case is encompassed in the present invention. In the viewpoint of obtaining a sufficient light absorbing ability, more preferably, the deviation of constituent element ratio from the stoichiometric ratio is within ±15%.

The molding is conducted on a base. The material of the base can be appropriately selected and used from the mate-rials, such as ceramic, a metal, and glass, which are gener-ally used in manufacturing of a shaped object, with consid-ering the use of the shaped object, the manufacturing conditions, etc. In step (iii), when the shaped object is heated together with the base, it is preferable to use ceramic having heat resistance as the base.

In the powder bed fusion system, as shown in FIGS. 1A to 1H, a powder is disposed in a predetermined thickness on the entire base with a roller, a blade, etc. In the cladding system, as shown in FIGS. 2A to 2C, a powder is injected and supplied from a nozzle to the position to be irradiated with a laser beam, and the powder is disposed on the base or the shaped object disposed on the base such that the powder is overlaid.

Step (ii)

In the subsequent step (ii), the powder disposed in step (i) is irradiated with laser based on the molding data generated from the three-dimensional shape data of a model to be produced to sinter or melt and solidify the powder.

In the powder bed fusion system, as shown in FIGS. 1A to 1H, a predetermined region of the powder layer disposed with a predetermined thickness on the base in step (i) is irradiated with a scanning laser beam to sinter or melt and solidify the powder. In the cladding system, as shown in FIGS. 2A to 2C, the powder is disposed selectively in a region to be molded such that the powder is injected and supplied and overlaid on the base in step (i) and is simul-taneously irradiated with a laser beam to melt and solidify the powder.

The absorber included in the powder absorbs energy when the powder is irradiated with a laser beam, and the energy is converted to heat to melt the powder. When the powder is sintered, a part of the particles melts. After passage of the laser beam and termination of the irradiation, the heat of the melted part escapes to the atmosphere and surroundings to cool the powder, and a solidified portion is formed. Since a sharp temperature change occurs in the process of melting and solidification, most of the formed shaped object becomes amorphous silica. In addition, the sharp tempera-ture change causes a stress in the surface layer and inside of the shaped object to form cracks in many cases. When cracks are formed, the heating step which is subsequently per-formed may reduce the cracks. In addition, cracks can be further reduced or extinguished by introducing a step of absorbing a metal component-containing liquid described later in detail.

As described above, when the powder of which the main component is silicon dioxide includes terbium oxide or praseodymium oxide, a phase-separated structure in which two or more phases are intricately intertwined with each other is formed in the network of connected spherical silica formed by melting of the powder. When heating treatment is performed for such structure in step (iii), silica is crystallized into cristobalite, resulting in an improvement of the mechanical strength of the shaped object.

The type of the laser beam is not particularly limited, and, for example, a 1 μm wavelength band YAG laser or fiber laser and a 10 μm wavelength band $CO_2$ laser are preferable. In particular, a 1 μm wavelength band YAG laser or fiber laser is preferable because of high absorption by terbium oxide and praseodymium oxide.

Step (iii)

Figure 4:
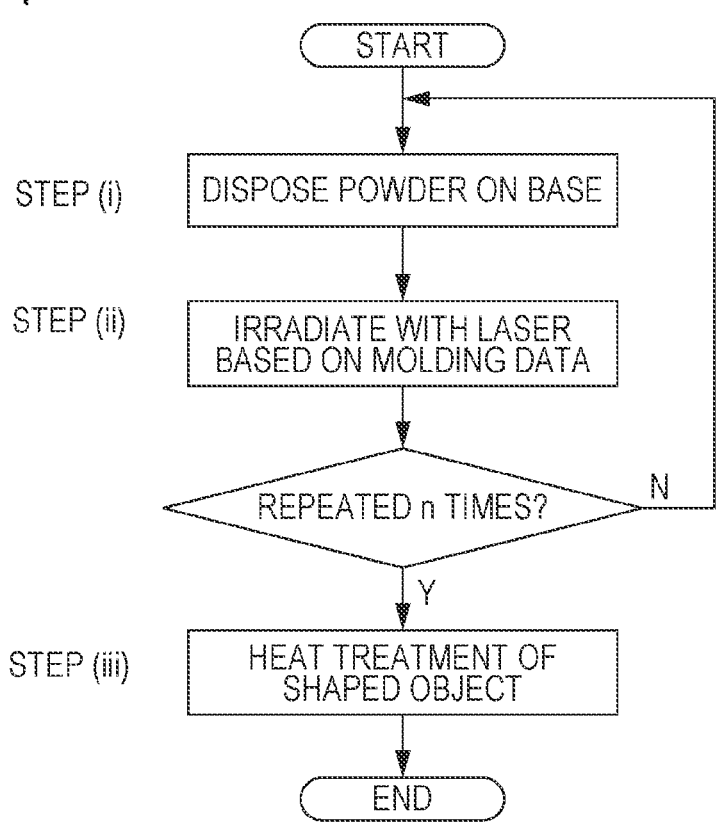
FIG. 4 is a diagram showing an example of a manufacturing flow of a ceramic article according to the present invention.

As shown in the flow chart of FIG. 4, in step (iii), the shaped object formed by repeating steps (i) and (ii) multiple times is heated at 1470° C. or more and less than 1730° C. The number of times of repeating corresponds to the number n of slices of the slice data generated from the three-dimensional shape data of a three-dimensional object to be manufactured.

In the shaped object, a new powder layer is disposed by step (i) on the solidified portion formed in steps (i) and (ii). The disposed powder is irradiated with a scanning laser beam based on the molding data generated from the three-dimensional shape data of a molding model. The powder of the region irradiated with the laser beam melts and solidifies. On this occasion, the surface layer of the solidified portion formed previously also melts and is thereby unified with the solidified portion formed later. A shaped object having a desired shape can be obtained according to the three-dimensional shape data of a molding model by alternately repeating the steps (i) and (ii).

Figure 5:
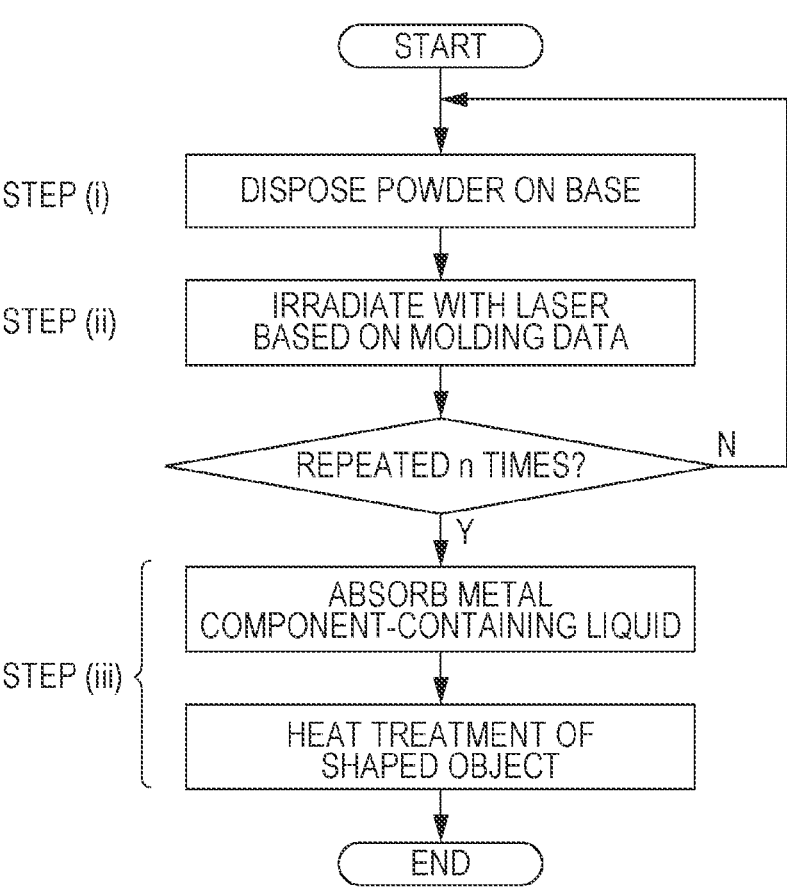
FIG. 5 is a diagram showing another example of a manufacturing flow of a ceramic article according to the present invention.

When a large number of cracks are included in the shaped object formed by repeating steps (i) and (ii), as shown in the flow chart of FIG. 5, it is preferable to perform treatment of allowing the shaped object to absorb the metal component-containing liquid before performing heating treatment.

As long as the metal component-containing liquid can be supplied to all over the cracks included in the shaped object in an amount required by the cracks, the procedure for allowing the shaped object to absorb the metal component-containing liquid is not particularly limited. The shaped object may be immersed in and impregnated with the metal component-containing liquid, or the metal component-containing liquid may be atomized and sprayed to the shaped object or may be applied to the surface with a brush or the like for absorption. Furthermore, two or more of these procedures may be combined, or the same procedure may be repeated a plurality of times.

As described above, in a shaped object of which the main component is silica, for example, an aluminum component-containing liquid or a zirconium component-containing liquid (a liquid containing zirconium) can be used as the metal component-containing liquid, and an aluminum component-containing liquid is particularly preferable. Hereinafter, the case of using an aluminum component-containing liquid as the metal component-containing liquid will be described in detail.

The aluminum component-containing liquid is preferably composed of, for example, a raw material including an aluminum element, a solvent, and a stabilizer. As the raw material including an aluminum element, various aluminum compounds can be used, and a metal alkoxide or chloride of aluminum can be used.

In the case of an aluminum component-containing liquid including aluminum as a metal alkoxide, it is preferable to include an aluminum alkoxide, an organic solvent, and a stabilizer. For example, an aluminum alkoxide is first dissolved in an organic solvent to prepare a solution of the aluminum alkoxide. Examples of the aluminum alkoxide include aluminum sec-butoxide, aluminum ethoxide, aluminum n-butoxide, aluminum tert-butoxide, and aluminum isopropoxide. The amount of the organic solvent to be added to the aluminum alkoxide is, in a molar ratio with respect to the compound, preferably 5 or more and 30 or less, more preferably 10 or more and 25 or less. Incidentally, in the present invention, the fact that the amount of M is 5 in a molar ratio with respect to N means that the molar amount of M to be added is 5 times the molar amount of N. If the concentration of the aluminum alkoxide in a solution is too low, a sufficient amount of the aluminum component cannot be absorbed by the shaped object. In contrast, if the concentration of the aluminum alkoxide in a solution is too high, the aluminum component in the solution aggregate, and the aluminum component cannot be disposed uniformly on the crack portion of the shaped object.

As the organic solvent for dissolving the aluminum alkoxide, alcohol, carboxylic acid, aliphatic and alicyclic hydrocarbons, aromatic hydrocarbons, ester, ketones, ethers, and a solvent mixture of two or more of these solvents are used. As the alcohols, for example, methanol, ethanol, 2-propanol, butanol, 2-methoxyethanol, 2-ethoxyethanol, 1-methoxy-2-propanol, 1-ethoxy-2-propanol, 1-propoxy-2-propanol, 4-methyl-2-pentanol, 2-ethylbutanol, 3-methoxy-3-methylbutanol, ethylene glycol, diethylene glycol, and glycerol are preferable. As the aliphatic and alicyclic hydrocarbons, for example, n-hexane, n-octane, cyclohexane, cyclopentane, and cyclooctane are preferable. As the aromatic hydrocarbons, for example, toluene, xylene, and ethylbenzene are preferable. As the esters, for example, ethyl formate, ethyl acetate, n-butyl acetate, ethylene glycol monomethyl ether acetate, ethylene glycol monoethyl ether acetate, and ethylene glycol monobutyl ether acetate are preferable. As the ketones, for example, acetone, methyl ethyl ketone, methyl isobutyl ketone, and cyclohexanone are preferable. As the ethers, for example, dimethoxyethane, tetrahydrofuran, dioxane, and diisopropyl ether are mentioned. In preparation of the aluminum component-containing liquid, from the point of stability of the solution, among the above-mentioned various solvents, it is preferable to use alcohols.

Since the reactivity of an aluminum alkoxide to water is high, the aluminum alkoxide is drastically hydrolyzed by the moisture in air or by addition of water to cause cloudiness of the solution or precipitation. In order to prevent them, it is preferable to add a stabilizer for stabilizing the solution. Examples of the stabilizer include β-diketone compounds, such as acetylacetone, 3-methyl-2,4-pentanedione, 3-ethyl-2,4-pentanedione, and trifluoroacetylacetone; β-ketoester compounds, such as methyl acetoacetate, ethyl acetoacetate, butyl acetoacetate, allyl acetoacetate, benzyl acetoacetate, isopropyl acetoacetate, tert-butyl acetoacetate, isobutyl acetoacetate, ethyl 3-oxohexanoate, ethyl 2-methylacetoacetate, ethyl 2-fluoroacetoacetate, and 2-methoxyethyl acetoacetate; and alkanolamines, such as monoethanolamine, diethanolamine, and triethanolamine. The amount of the stabilizer to be added is preferably 0.1 or more and 3 or less, more preferably 0.5 or more and 2 or less, in a molar ratio with respect to aluminum alkoxide.

The solution may be prepared by a reaction at room temperature or may be prepared under reflux.

In the case of an aluminum component-containing liquid including aluminum as a chloride, it is preferable to include an aluminum salt and water. The aluminum salt is not particularly limited as long as it is water-soluble and is particularly preferably, for example, a nitrate, a sulfate, an acetate, and a chloride. In some types of aluminum salts, the aqueous solutions thereof are unstable. In such a case, the solution may be stabilized by addition of a stabilizer. As the stabilizer, at least one of an organic acid, a surfactant, and a chelating agent is preferably included. As the organic acid, for example, acrylic acid, 2-hydroxyethyl acrylate, 2-acryloxyethylsuccinic acid, 2-acryloxyethylhexahydrophthalic acid, 2-acryloxyethylphthalic acid, 2-methylhexanoic acid, 2-ethylhexanoic acid, 3-methylhexanoic acid, and 3-ethylhexanoic acid are preferable. As the surfactant, for example, ionic surfactants, such as sodium oleate, potassium fatty acid, sodium alkyl phosphate, alkylmethylammonium chloride, and alkylaminocarboxylate, and nonionic acids, such as polyoxyethylene laurin fatty acid ester and polyoxyethylene alkylphenyl ether, are preferable. As the chelating agent, for example, hydroxy acids, such as glycolic acid, ascorbic acid, citric acid, malonic acid, gluconic acid, oxalic acid, succinic acid, malic acid, tartaric acid, and lactic acid, amino acids, such as glycine, alanine, glutamic acid, aspartic acid, histidine, phenylalanine, asparagine, arginine, glutamine, cystine, leucine, lysine, proline, serine, tryptophan, valine, and tyrosine, aminocarboxylic acids, such as diethylenetriaminepentaacetic acid (DTPA), hydroxyethylethylenediaminetriacetic acid (HEDTA), triethylenetetraaminehexaacetic acid (TTHA), 1,3-propanediaminetetraacetic acid (PDTA), 1,3-diamino-6-hydroxypropanetetraacetic acid (DPTA-OH), hydroxyethyliminodiacetic acid (HIDA), dihydroxyethylglycine (DHEG), glycol ether diaminetetraacetic acid (GEDTA), dicarboxymethylglutamic acid (CMGA), and (S,S)-ethylenediaminedisuccinic acid (EDDS), phosphonic acids, such as 1-hydroxyethylidene-1,1-diphosphonic acid (HEDP), 2-phosphobutanone-1,2,4-tricarboxylic acid (PBTC), ethylenediaminetetra(methylenephosphonic acid), diethylenetriaminepenta(methylenephosphonic acid), and nitrilotris(methylenephosphonic acid), and aromatic acids, such as salicylic acid, are preferable.

The method for manufacturing the aluminum component-containing liquid is not limited. The aluminum component-containing liquid is preferably produced by mixing an aluminum salt, water, and a stabilizer, but may be produced by mixing all components at once. Alternatively, the aluminum component-containing liquid may be produced by mixing a metal salt and a stabilizer and then adding and mixing water, or mixing a metal salt and water and then adding and mixing a stabilizer, or mixing a stabilizer and water and then adding and mixing a metal salt.

Alternatively, as the aluminum component-containing liquid, the use of a particle dispersion composed of particles including an aluminum element, a dispersant, and a solvent is also preferable.

As the particles including an aluminum element, aluminum particles or alumina particles can be used. The aluminum particles or the alumina particles may be produced by crushing the respective materials by a top-down method or may be synthesized by a bottom-up method from, for example, a metal salt, a hydrate, a hydroxide, or a carbonate using a procedure such as a hydrothermal reaction. Alternatively, a commercial product may be used.

The size of the particles is 300 nm or less, more preferably 50 nm or less, and further preferably 30 nm or less for allowing the particles to invade into cracks.

The shape of the minute particles is not particularly limited and may be spherical, granular, columnar, elliptical spherical, cubic, rectangular parallelepiped, needle-like, plate-like, scaly, or pyramid-like.

As the dispersant, at least one selected from an organic acid, a silane coupling agent, and a surfactant is preferably included. As the organic acid, for example, acrylic acid, 2-hydroxyethyl acrylate, 2-acryloxyethylsuccinic acid, 2-acryloxyethylhexahydrophthalic acid, 2-acryloxyethylphthalic acid, 2-methylhexanoic acid, 2-ethylhexanoic acid, 3-methylhexanoic acid, and 3-ethylhexanoic acid are preferable. As the silane coupling agent, for example, 3-acryloxypropyltrimethoxysilane, 3-methacryloxypropyltrimethoxysilane, hexyltrimethoxysilane, octyltriethoxysilane, and decyltrimethoxysilane are preferable. As the surfactant, for example, ionic surfactants, such as sodium oleate, potassium fatty acid, sodium alkyl phosphate, alkylmethylammonium chloride, and alkylaminocarboxylate, and nonionic acids, such as polyoxyethylene laurin fatty acid ester and polyoxyethylene alkylphenyl ether, are preferable.

As the solvent, alcohols, ketones, esters, ethers, ester-modified ethers, hydrocarbons, halogenated hydrocarbons, amides, water, oils, and a solvent mixture of two or more thereof are used. As the alcohols, for example, methanol, ethanol, 2-propanol, isopropanol, 1-butanol, and ethylene glycol are preferable. As the ketones, for example, acetone, methyl ethyl ketone, methyl isobutyl ketone, and cyclohexanone are preferable. As the esters, for example, ethyl acetate, propyl acetate, butyl acetate, 4-butyrolactone, propylene glycol monomethyl ether acetate, and methyl 3-methoxypropionate are preferable. As the ethers, for example, ethylene glycol monomethyl ether, diethylene glycol monobutyl ether, butyl carbitol, 2-ethoxyethanol, 1-methoxy-2-propanol, and 2-butoxyethanol are preferable. As the modified ethers, for example, propylene glycol monomethyl ether acetate is preferable. As the hydrocarbons, for example, benzene, toluene, xylene, ethylbenzene, trimethylbenzene, hexane, cyclohexane, and methylcyclohexane are preferable. As the halogenated hydrocarbons, for example, dichloromethane, dichloroethane, and chloroform are preferable. As the amides, for example, dimethylformamide, N,N-dimethylacetamide, and N-methylpyrrolidone are preferable. As the oils, for example, mineral oil, vegetable oil, wax oil, and silicone oil are preferable.

The particle dispersion may be produced by mixing aluminum particles or alumina particles, a dispersant, and a solvent at once or by mixing aluminum particles or alumina particles and a dispersant and then mixing a solvent. Alternatively, the particle dispersion may be produced by mixing the above-mentioned minute particles of aluminum or alumina and the solvent and then mixing the dispersant or by mixing the dispersant and the solvent and then mixing the minute particles of aluminum or alumina.

In the above step (iii), in order to allow the cracks formed in the shaped object to absorb the aluminum component-containing liquid and to melt regionally the vicinities of the area where the aluminum element is present, the heating temperature and the amount of the aluminum element in the cracks may be adjusted. The amount of the aluminum element in the cracks can be adjusted by, for example, the concentration of the aluminum element in the aluminum component-containing liquid or the method for allowing the cracks to absorb the aluminum component-containing liquid and the number of times thereof. Alternatively, the adjustment is also possible by repeating the process of absorbing the aluminum component-containing liquid and heating in order. In particular, the vicinities of cracks are more likely to melt by increasing the amount of the aluminum element present in the cracks. Thus, the complicated shape or precise shape formed by a direct molding system is maintained without collapsing the shape of the shaped object by adjusting the amount of the aluminum element present in cracks, and the shaped object shape substantially as designed can be obtained to achieve molding with high molding accuracy.

The silica shaped object absorbed the aluminum component-containing liquid is heated at a temperature not lower than the eutectic point of the eutectic phase formed by silica and aluminum oxide and not higher than the melting point (1710° C.) of silica. Consequently, silica present in the cracks in the surface layer and inside of the silica-based shaped object melts in an amount corresponding to the amount of aluminum oxide generated from the aluminum component-containing liquid or aluminum oxide included in the aluminum component-containing liquid from the beginning for forming the eutectic composition. That is, since aluminum oxide is present in the surface of the shaped object, which is brought into contact with the aluminum component-containing liquid, in an amount larger than that in the area apart from cracks, the vicinities of cracks approach the eutectic composition and can be selectively melted. Silica is allowed to convert to cristobalite, and at the same time, cracks can be reduced or extinguished by performing the heating treatment such that the maximum temperature of the silica in the vicinities of cracks after the step of allowing absorption of the aluminum component-containing liquid is 1595° C. or more and less than 1730° C.

The heating time is not limited as long as the vicinities of cracks reach the above-mentioned maximum temperature. Specifically, the shaped object may be heated at 1595° C. or more and less than 1730° C., which is the temperature the vicinities of cracks are required to reach.

The method of heating is not particularly limited. The shaped object absorbed the aluminum component-containing liquid may be heated by irradiation with an energy beam or may be heated by putting in an electric furnace. In the case of heating with an energy beam, it is preferable to grasp the relationship between the amount of heat of the energy beam and the temperature of the shaped object in advance with a thermocouple, etc. so that the shaped object is heated to the above-mentioned preferable temperature.

In the heating treatment step, the shaped object may adhere to the setter by melting of the surface layer or the vicinities of cracks. Accordingly, when the shaped object is disposed on a setter in the heating treatment step, the setter is preferably inert. As the inert setter, for example, platinum is applicable in the atmosphere, and iridium is applicable in a low oxygen atmosphere.

In step (iii), a phase (crystal grains) including silicon dioxide and terbium or praseodymium and a phase (crystal grains) including an aluminum element are formed in the shaped object, but the granularities (for example, average particle diameters) thereof are highly different. This is inferred that since the crack portions and the vicinities thereof melt to move in the direction of reducing the surface energy, the cracks are decreased or extinguished. It is also inferred that as the heating further progresses, the aluminum component distributed in the crack portions diffuses to the crystalline and amorphous inside of the shaped object, and the crystals of the shaped object recrystallize in a state of including the aluminum component. In addition to that the cracks in the shaped object are thus decreased or extinguished, a phase-separated structure composed of a plurality of phases in which the average particle diameters of crystal grains are different from each other is formed. Consequently, the machinability of the shaped object is improved, and precise finishing processing with less cracking is possible.
Ceramic Article The ceramic article of the present invention preferably has a phase-separated structure including two or more, in particular, three or more types of phases. A preferable combination of three types of phases is composed of a phase of which the main component is $SiO_2$, a phase of which the main component is a rare earth silicate including terbium or praseodymium, and a phase of which the main component is $Al_2O_3$, which is an oxide of a metallic element included in the metal component-containing liquid. The $SiO_2$, rare earth silicate, and $Al_2O_3$ are in a relationship of forming a eutectic with one another, and a complicated phase-separated structure consisting of three types of phases can be stably formed.

The phase of which the main component is $SiO_2$ is cristobalite converted from amorphous silica in the heating process of step (iii). As the phase of which the main component is a rare earth silicate including terbium or praseodymium, specifically a $Si_2Tb_2O_7$ phase and a $Si_2Pr_2O_7$ phase are preferable forms. Each phase can be identified by structural analysis through, for example, X-ray diffraction, electron beam diffraction, or EBSD (electron backscattering diffraction). The crystal structure of each phase varies slightly depending on the manufacturing process, but the three type phases forming a eutectic are preferably made of a crystal structure as described above.

Cristobalite is classified into $\alpha$-cristobalite and $\beta$-cristobalite and has a phase transition temperature of about 240° C. Since the volume of cristobalite drastically changes drastically at this phase transition temperature, cristobalite is recognized as a material vulnerable to a temperature change. However, in the present invention, even if silica is converted to cristobalite, a mechanical strength excellent against temperature changes is obtained. It is inferred that this is because the silica-based structure includes, in addition to cristobalite, a phase-separated structure consisting of a plurality of phases such as a $Tb_2Si_2O_7$ phase and a $Pr_2Si_2O_7$ phase. It is inferred that when the silica-based structure has a phase-separated structure consisting of a plurality of phases, the volume change by thermal expansion at the phase transition temperature becomes gradual, and a sharp volume change due to a temperature change is prevented.

In the use as a casting core, the content of Si in the ceramic article of the present invention is preferably higher than 80 mass % in oxide conversion ($SiO_2$ conversion). If the content of Si is 80 mass % or less, solubility in an alkaline solution required as a casting core is not obtained. Examples of the alkaline solution include sodium hydroxide aqueous solution and potassium hydroxide aqueous solution.

The content of Tb or Pr in the ceramic article of the present invention is preferably 1.0 mass % or more and 20 mass % or less, more preferably 3.0 mass % or more and 15 mass % or less, in oxide conversion ($Tb_2O_3$ or $Pr_2O_3$ conversion). If the content of Tb or Pr is less than 1.0 mass %, since the absorption amount of laser energy is small, there is a risk that a highly precise shaped object cannot be obtained. If the content of Tb or Pr is higher than 20 mass %, solubility in an alkaline aqueous solution required as a casting core is not obtained.

In the ceramic article of the present invention, 70 mass % or more of silicon dioxide is cristobalite binding to oxygen. If the amount of cristobalite is smaller than 70 mass %, there is a risk that a strength required as a casting core is not obtained. Preferably, 90 mass % or more, more preferably 95 mass % or more, of silicon dioxide is cristobalite.

The ceramic article of the present invention preferably has a porosity of 10% or more and 40% or less. If the porosity is less than 10%, the bending strength becomes too high, and the cast may be broken when used as a casting core. If the porosity is higher than 40%, a strength necessary as a structure is not obtained. Incidentally, the term "porosity" in the present invention refers to apparent porosity, which will be described in detail later.

The content of boron (B) contained in the ceramic article in the present invention is preferably less than 1000 ppm. If the content of B is higher than 1000 ppm, the softening point is lowered, and heat resistance required as a casting core is not obtained in some cases.
Method for Evaluating Physical Property>(Mechanical Strength The mechanical strength of a shaped object was evaluated by a three-point bending test based on JIS (Japanese Industrial Standard) R1601 for a bending strength test of fine ceramics at room temperature. The three-point bending strength was calculated using the maximum load P [N], the distance L [mm] between external fulcrums, the width w [mm] of the test piece, and the thickness t [mm] of the test piece when each of 10 test pieces is broken by $$3 \times P \times L / (2 \times w \times t2) \qquad \text{(Equation 1),}$$

and averaging them.
Porosity

The porosity of a shaped object was evaluated by a method based on JIS R1634 for measurement methods for density and apparent porosity of fine ceramics.

Specifically, the porosity was calculated using the dry mass W1, mass W2 in water, and water saturation mass W3 of a shaped object by $\{(W3-W1)/(W3-W2)\} \times 100$ for each of three ceramic articles similar to the samples used for measuring the mechanical strength and averaging them.
Relative Density The relative density [%] was calculated by dividing the bulk density (obtained by dividing the mass by the volume) of a shaped object by the theoretical density. The theoretical density was calculated from the crystal structure. The crystal structure was identified by performing X-ray diffraction measurement and performing Rietveld analysis.

Crystal Structure

The phase included in the ceramic article was identified by X-ray diffraction measurement of a measurement surface prepared by polishing a cross-section of the central part of a measurement object.

The content of each phase included in the measurement object was calculated by the following method. Ten different positions in a visual field of a 100 μm×100 μm size of the measurement surface were subjected to simultaneous analysis of SEM-EDX and EBSD, and mapping for the composition and the crystalline phase was performed. The area ratio occupied by each phase was determined for the produced 10 maps, and the ratio of each phase included in the sample was calculated from the value obtained by averaging them. When a small phase is included, the composition and the crystal structure can be similarly analyzed using a transmission electron microscope (TEM).

The particle diameter of the crystal grains constituting a phase was calculated by observing 300 or more crystal grains in a single phase observed in a measurement surface using EBSD and calculating the average of the equivalent circle diameters of the crystal grains.

Composition Analysis

The contents of Si, Tb, Pr, Al, and Zr included in a powder, a shaped object, or a ceramic article were measured by inductively coupled plasma atomic emission spectroscopy (ICP-AES), and the contents of other elements including B were measured by GDMS or ICP-MS.

EXAMPLES

Example 1

A $SiO_2$ powder having an average particle diameter of about 38 μm and a $Tb_4O_7$ powder having an average particle diameter of 4 μm were prepared and were weighed such that the content of Si is 90.0 mass % in oxide conversion ($SiO_2$ conversion) and the content of Tb is 10.0 mass % in oxide conversion ($Tb_4O_7$ conversion) (Table 1). Incidentally, in the $SiO_2$ powder, cristobalite was the main component. The weighed powders were mixed with a dry ball mill for 30 minutes to obtain a powder mixture. Incidentally, the average particle dimeter in the present invention is the median diameter (also referred to as central value) and the particle diameter (D50) at which the cumulative frequency is 50%. In the composition analysis of the powder mixture by ICP spectroscopic analysis, the content of aluminum oxide was less than 1 mass %.

| | | | Absorber | | |
|---|---|---|---|---|---|
| | Si (wt %) | Al (wt %) | Tb (wt %) | Pr (wt %) | Si (wt %) |
| Example 1 | 90.0 | 0 | 10.0 | 0 | 0 |
| Example 2 | 90.0 | 0 | 10.0 | 0 | 0 |
| Example 3 | 90.0 | 0 | 10.0 | 0 | 0 |
| Example 4 | 90.0 | 0 | 10.0 | 0 | 0 |
| Example 5 | 90.0 | 0 | 10.0 | 0 | 0 |
| Example 6 | 94.0 | 0 | 6.0 | 0 | 0 |
| Example 7 | 99.0 | 0 | 1.0 | 0 | 0 |
| Example 8 | 97.0 | 0 | 3.0 | 0 | 0 |
| Example 9 | 80.5 | 0 | 19.5 | 0 | 0 |
| Example 10 | 80.5 | 0 | 19.5 | 0 | 0 |
| Example 11 | 99.5 | 0 | 0.50 | 0 | 0 |
| Example 12 | 90.0 | 0 | 10.0 | 0 | 0 |
| Example 13 | 90.0 | 0 | 10.0 | 0 | 0 |
| Example 14 | 90.0 | 0 | 10.0 | 0 | 0 |
| Example 15 | 90.0 | 0 | 10.0 | 0 | 0 |
| Example 16 | 90.0 | 0 | 10.0 | 0 | 0 |

-continued

| | | | Absorber | | |
|---|---|---|---|---|---|
| | Si (wt %) | Al (wt %) | Tb (wt %) | Pr (wt %) | Si (wt %) |
| Example 17 | 90.0 | 0 | 0 | 10.0 | 0 |
| Example 18 | 90.0 | 0 | 10.0 | 0 | 0 |
| Example 19 | 97.3 | 0 | 0 | 0 | 2.7 |
| Example 20 | 67.6 | 30.1 | 0 | 0 | 2.3 |
| Example 21 | 55.4 | 42.5 | 0 | 0 | 2.1 |
| Comparative Example 1 | 72.0 | 0 | 28.0 | 0 | 0 |
| Comparative Example 2 | 72.0 | 0 | 28.0 | 0 | 0 |
| Comparative Example 3 | 90.0 | 0 | 10.0 | 0 | 0 |
| Comparative Example 4 | 90.0 | 0 | 10.0 | 0 | 0 |

Subsequently, a shaped object of Example 1 was produced as in the steps shown in FIGS. 1A to 1H. The shape of the produced shaped object is a rectangular parallelepiped of 5 mm×42 mm×6 mm. The shaped object was formed using ProXDMP 100 (trade name) of 3D Systems, Inc. equipped with a 50 W fiber laser (beam diameter: 65 μm).

First, a first powder layer of the above-described powder was formed at a thickness of 20 μm on an alumina base 130 using a roller (FIGS. 1A and 1B).

Figure 6A:
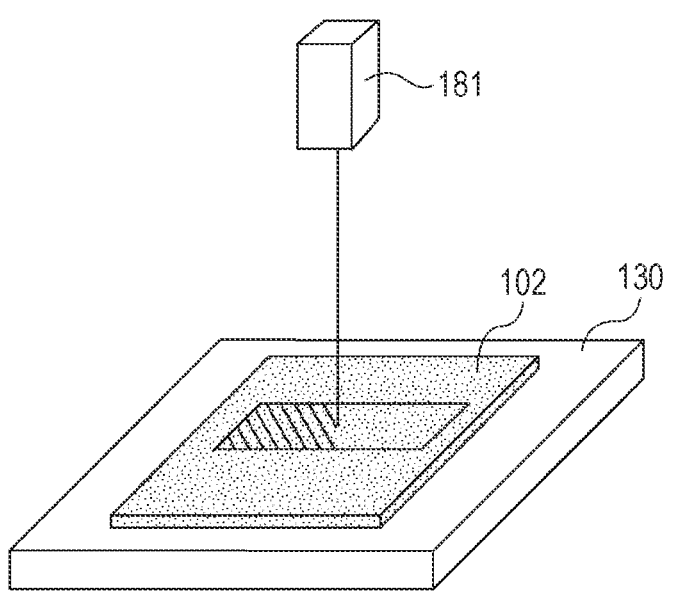
FIG. 6A is a schematic perspective view illustrating a laser irradiation process in an example of the present invention.

Subsequently, the powder layer was irradiated with a scanning laser beam with a power of 47.5 W to melt and solidify the material powder in a rectangular region of 5 mm×42 mm to form a solidified portion 100 (FIG. 1C). The drawing speed on this occasion was 60 mm/s, and the drawing pitch was 80 μm. The drawing line was, as shown in FIG. 6A, set to be at an angle of 45 degrees with respect to each side of the rectangle.

Figure 1D:
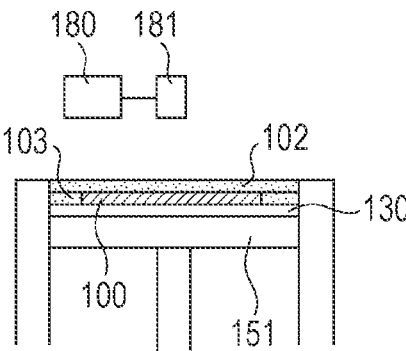
FIG. 1D is a schematic cross-sectional view schematically illustrating an embodiment of the method for manufacturing a shaped object by a powder bed fusion system.
Figure 1E:
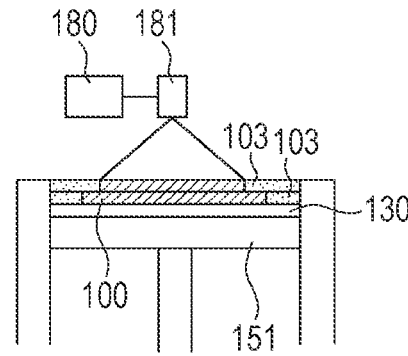
FIG. 1E is a schematic cross-sectional view schematically illustrating an embodiment of the method for manufacturing a shaped object by a powder bed fusion system.
Figure 1F:
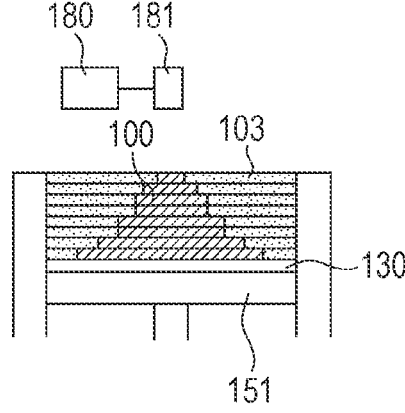
FIG. 1F is a schematic cross-sectional view schematically illustrating an embodiment of the method for manufacturing a shaped object by a powder bed fusion system.
Figure 1G:
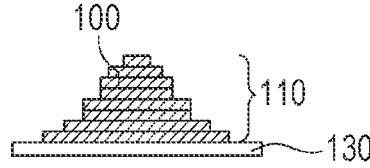
FIG. 1G is a schematic cross-sectional view schematically illustrating an embodiment of the method for manufacturing a shaped object by a powder bed fusion system.
Figure 1H:
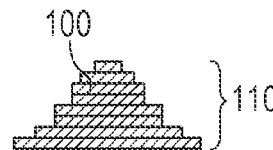
FIG. 1H is a schematic cross-sectional view schematically illustrating an embodiment of the method for manufacturing a shaped object by a powder bed fusion system.
Figure 6B:
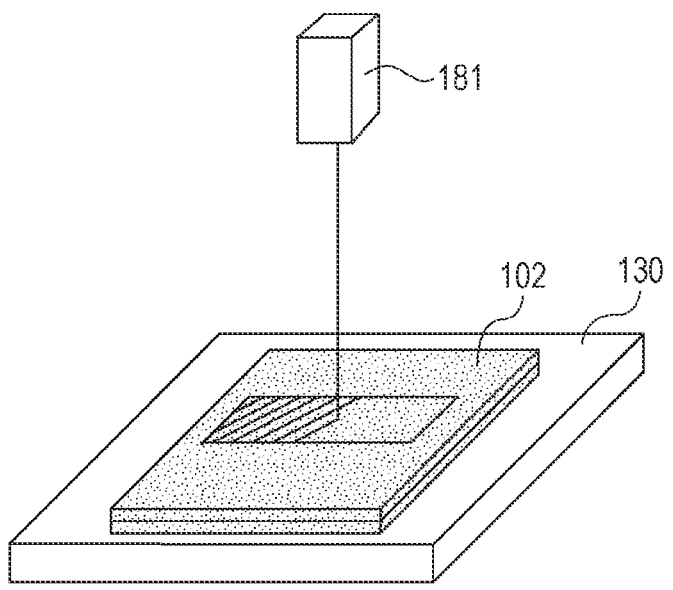
FIG. 6B is a schematic perspective view illustrating a laser irradiation process in an example of the present invention.

Subsequently, a powder layer of 20 μm thickness was newly formed with a roller so as to cover the solidified portion 100 and was irradiated with a scanning laser beam to melt and solidify the material powder in a rectangular region of 5 mm×42 mm to form a solidified portion 100 (FIGS. 1D and 1E). On this occasion, as shown in FIG. 6B, the laser was scanned in the direction orthogonal to the drawing line of the first layer to melt and solidify the powder. These processes were repeated until the height of the solidified portion reached 6 mm, and 14 shaped objects of 42 mm×5 mm×6 mm were produced.

When the surfaces of the shaped objects were observed with an optical microscope, the Ra of each shaped object surface measured while avoiding pores was 30 μm or less.

The produced shaped objects were each detached from the alumina base, and 13 shaped objects were polished to obtain shaped objects of 40 mm×4 mm×3 mm as test pieces for a three-point bending strength test and for porosity measurement.

In the porosity evaluation of the test piece produced for porosity measurement, the porosity was 18.4%. In addition, the measurement of the X-ray diffraction of the polished surface revealed that the crystalline phase in the ceramic article was almost amorphous.

The shaped objects excluding the test pieces for porosity measurement were placed in an electric furnace and were heat-treated. Specifically, the temperature was increased to 1610° C. over 2.5 hours in the atmosphere and was held at 1610° C. for 50 minutes, and the energization was then stopped for cooling to 200° C. or less over 5.0 hours.

When the composition of the obtained ceramic article was measured by ICP-AES, the content of Si was 90.3 mass % in SiO$_2$ conversion, and the content of Tb was 9.7 mass % in Tb$_2$O$_3$ conversion. When GDMS analysis was performed, the content of B was 0.4 ppm.

Subsequently, in order to analyze the crystal structure of the ceramic article, the ceramic article was cut and polished. First, both sides of the unpolished ceramic article were cut with a wire saw so that the central portion remained to obtain a test piece of 10 mm×4 mm×3 mm. Then, about 1.5 mm was polished in the H direction, and mirror surface polishing was further performed to obtain an observation surface of 10 mm×4 mm.

It was revealed from the X-ray diffraction of the observation surface that the crystalline phase in the ceramic article was composed of cristobalite (SiO$_2$) and Tb$_2$Si$_2$O$_7$ phase.

Furthermore, the observation surface was subjected to simultaneous analysis of SEM-EDX and EBSD. Ten different positions in a visual field of a 100 μm×100 μm size were analyzed to obtain a map of composition and crystalline phase. As a result, almost all of the SiO$_2$ portion was cristobalite, and the rate thereof was 97 [mass %]. The remain was amorphous silica in which the Kikuchi pattern was not detected by EBSD. Incidentally, the ratio between cristobalite and amorphous silica was calculated from each area obtained by SEM-EDX and EBSD mapping, the density of general cristobalite of 2.3 g/cc, and the density of general amorphous silica of 2.2 g/cc. The Tb$_2$Si$_2$O$_7$ phase was scattered all over the visual field, and the average equivalent circle diameter calculated from the area obtained by mapping was 2.3 μm.

The test piece for strength test was subjected to a three-point bending test, and the strength was 7.2 [MPa].

The contents of Si, Tb, Al, Zr, and B, porosity, and three-point bending strength of the ceramic article were evaluated. The results are shown in Table 2. The same evaluations were also performed for the following Examples and Comparative Examples. The results are shown in Table 2.

Incidentally, in Table 1 showing the weights of powders, the contents of Si, Al, and Tb, Pr, and Si of an absorber are shown by numerical values converted to SiO$_2$, Al$_2$O$_3$, Tb$_4$O$_7$, Pr$_6$O$_{11}$, and SiO, respectively. In addition, in Table 2 showing the results of evaluation of ceramic articles, the contents of Si, Tb, Pr, Al, and Zr are shown by numerical values converted to SiO$_2$, Tb$_2$O$_3$, Pr$_2$O$_3$, Al$_2$O$_3$, and ZrO$_2$, respectively.

TABLE 2

| | Si (wt %) | Al (wt %) | Tb (wt %) | Pr (wt %) | Zr (wt %) | B (ppm) | Number of times of liquid absorption (times) | Firing temperature (° C.) | Porosity (vol %) | 3-point bending strength (MPa) |
|---|---|---|---|---|---|---|---|---|---|---|
| Example 1 | 90.2 | 0 | 9.8 | 0 | 0 | 0.4 | 0 | 1610 | 18.4 | 7.2 |
| Example 2 | 90.1 | 0.2 | 9.7 | 0 | 0 | 0.4 | 1 | 1610 | 16.0 | 11 |
| Example 3 | 89.9 | 0.3 | 9.8 | 0 | 0 | 0.5 | 2 | 1610 | 15.1 | 20 |
| Example 4 | 89.9 | 0 | 9.8 | 0 | 0.3 | 0.4 | 1 | 1670 | 16.3 | 10 |
| Example 5 | 89.4 | 0 | 9.8 | 0 | 0.8 | 0.6 | 2 | 1670 | 15.2 | 12 |
| Example 6 | 93.0 | 0.3 | 6.7 | 0 | 0 | 0.8 | 2 | 1610 | 15.3 | 18 |
| Example 7 | 98.6 | 0.4 | 1.0 | 0 | 0 | 0.3 | 2 | 1610 | 15.1 | 18 |
| Example 8 | 88.9 | 0.3 | 10.8 | 0 | 0 | 0.4 | 2 | 1610 | 15.2 | 19 |
| Example 9 | 80.6 | 0.3 | 19.1 | 0 | 0 | 0.4 | 2 | 1610 | 14.9 | 23 |
| Example 10 | 80.8 | 0 | 19.2 | 0 | 0 | 0.4 | 0 | 1610 | 18.5 | 8.0 |
| Example 11 | 99.6 | 0 | 0.4 | 0 | 0 | 0.6 | 0 | 1610 | 20.5 | 11 |
| Example 12 | 90.2 | 0 | 9.8 | 0 | 0 | 0.3 | 0 | 1470 | 18.3 | 5.3 |
| Example 13 | 90.2 | 0 | 9.8 | 0 | 0 | 0.3 | 0 | 1530 | 18.5 | 6.1 |
| Example 14 | 90.2 | 0 | 9.8 | 0 | 0 | 0.5 | 0 | 1580 | 18.3 | 6.8 |
| Example 15 | 90.5 | 0 | 9.3 | 0 | 0 | 2030 | 0 | 1470 | 18.0 | 4.7 |
| Example 16 | 90.3 | 0 | 9.6 | 0 | 0 | 950 | 0 | 1470 | 18.6 | 5.2 |
| Example 17 | 90.3 | 0 | 0 | 9.7 | 0 | 0.5 | 0 | 1610 | 18.8 | 7.0 |
| Example 18 | 90.1 | 0.2 | 9.7 | 0 | 0 | 0.4 | 1 | 1610 | 15.5 | 22 |
| Example 19 | 99.7 | 0.3 | 0 | 0 | 0 | 0.4 | 2 | 1610 | 15.5 | 19 |
| Example 20 | 69.9 | 29.8 | 0 | 0 | 0.3 | 0.5 | 1 | 1680 | 18.0 | 30 |
| Example 21 | 57.7 | 42.0 | 0 | 0 | 0.3 | 0.5 | 1 | 1680 | 15.0 | 56 |
| Comparative Example 1 | 72.7 | 0 | 27.3 | 0 | 0 | 0.5 | 0 | 1610 | 30.0 | 1.2 |
| Comparative Example 2 | 72.5 | 0 | 27.5 | 0 | 0 | 0.6 | 0 | 1610 | 18.1 | 6.8 |
| Comparative Example 3 | 90.4 | 0 | 9.6 | 0 | 0 | 0.4 | 0 | 1440 | 19.0 | 2.0 |
| Comparative Example 4 | 90.2 | 0 | 9.8 | 0 | 0 | 0.3 | 0 | 1740 | 18.1 | — |

Example 2

A ceramic article was produced as in Example 1 except that the produced shaped object was impregnated with an aluminum component-containing liquid before performing heating treatment.

The aluminum component-containing liquid was prepared as follows. Aluminum sec-butoxide was dissolved in 2-propanol (IPA), and ethyl acetoacetate (EAcAc) was added thereto as a stabilizer. The molar ratio of each component was set to aluminum sec-butoxide:IPA:EAcAc=1.04:5:2. The mixture was then stirred at room temperature for about 3 hours to prepare an aluminum component-containing liquid.

In Example 2, a shaped object of W 40 mm×D 4 mm×H 3 mm processed for a test was immersed in the prepared aluminum component-containing liquid, deaerated under reduced pressure for 1 minute to absorb the liquid into the inside of the shaped object, and then naturally dried for 1 hour.

Then, the shaped object absorbed the aluminum component-containing liquid was placed in an electric furnace and heated. The temperature was increased to 1610° C. over 2.5 hours in the atmosphere and was held at 1610° C. for 50 minutes, and the energization was then stopped for cooling to 200° C. or less over 5.0 hours.

The surface of the obtained ceramic article was polished, and the crystal structure was analyzed by X-ray diffraction and EBSD. As a result, $SiO_2$ was cristobalite, and the rate thereof was 97 mass %. In addition, a $Si_2Tb_2O_7$ phase was also observed.

Example 3

Example 3 was different from Example 2 in that the step of allowing the produced shaped object to absorb the aluminum component-containing liquid and the step of heating treatment were alternately repeated twice.

Three ceramic articles of W 40 mm×D 4 mm×H 3 mm were produced for a three-point bending strength test, and one ceramic article, which was the same ceramic article as for the strength test, was produced for composition and structural evaluation.

The surface of the obtained ceramic article was polished, and the crystal structure was analyzed by X-ray diffraction and EBSD. As a result, $SiO_2$ was cristobalite, and the rate thereof was 98 mass %. In addition, a $Si_2Tb_2O_7$ phase was also observed.

Example 4

A ceramic article was produced as in Example 1 except that impregnation with a zirconium component-containing liquid was performed before heating treatment and that the heating treatment temperature was 1670° C.

The zirconium component-containing liquid was prepared as follows. A solution in which 85 mass % of zirconium butoxide (zirconium(IV) butoxide, (hereinafter, referred to as Zr(O-n-Bu)4)) was dissolved in 1-butanol was prepared. The solution of Zr(O-n-Bu)4 was dissolved in 2-propanol (IPA), and ethyl acetoacetate (EAcAc) was added thereto as a stabilizer. The molar ratio of each component was set to Zr(O-n-Bu)4:IPA:EAcAc=1:15:2. The mixture was then stirred at room temperature for about 3 hours to prepare a zirconium component-containing liquid.

In Example 4, the shaped object processed for a test was immersed in the zirconium component-containing liquid, deaerated under reduced pressure for 1 minute for impregnation of the liquid into the shaped object, and then naturally dried for 1 hour. Subsequently, the shaped object impregnated with the zirconium component-containing liquid was placed in an electric furnace and heated. The temperature was increased to 1670° C. over 2.5 hours in the atmosphere and was held at 1670° C. for 50 minutes, and the energization was then stopped for cooling to 200° C. or less over 1.5 hours.

Subsequently, the surface of the obtained ceramic article was polished, and the crystal structure was analyzed by X-ray diffraction and EBSD. As a result, $SiO_2$ was cristobalite, and the rate thereof was 98 mass %. In addition, a $Si_2Tb_2O_7$ phase was also observed.

Example 5

Example 5 was different from Example 4 in that the step of impregnating the shaped object with the zirconium component-containing liquid and the step of heating treatment were alternately repeated twice.

The produced ceramic articles were three cubes of W 40 mm×D 4 mm×H 3 mm for a three-point bending strength test, one cube, which was the same cube as for the strength test, for composition and structural evaluation, and one cube of W 5 mm×D 5 mm×H 5 mm for an abrasion resistant test.

The produced silica-based structure was evaluated. As a result, $SiO_2$ was cristobalite, and the rate thereof was 99 mass %. In addition, a $Si_2Tb_2O_7$ phase was also observed.

Examples 6 to 9

Ceramic articles of Examples 6 to 9 were produced by alternately repeating the step of impregnation with the aluminum component-containing liquid and the step of heating treatment twice as in Example 3 except that the mass ratios of the $SiO_2$ powder and the $Tb_4O_7$ powder were changed. Table 1 shows the mass ratios in the powder mixtures of these Examples.

Examples 10 and 11

Ceramic articles of Examples 10 and 11 were produced as in Example 1 except that the mass ratios of the $SiO_2$ powder and the $Tb_4O_7$ powder were changed. Table 1 shows the mass ratios in the powder mixtures of these Examples.

Examples 12 to 14

Ceramic articles of Examples 12 to 14 were produced by the same steps as in Example 1 except that a powder prepared by mixing the $SiO_2$ powder and the $Tb_4O_7$ powder at a mass ratio shown in Table 1 was used and that the heating treatment temperature was changed. The heating treatment temperatures are shown in Table 2.

Examples 15 and 16

A powder prepared by weighing a $SiO_2$ powder and a $Tb_4O_7$ powder at the mass ratio shown in Table 1 and adding a trace amount of a $B_2O_3$ powder thereto and mixing them was used. Ceramic articles of Examples 15 and 16 were produced by the same steps as in Example 1 except that the heating treatment temperature was 1470° C.

Example 17

A ceramic article of Example 17 was produced by the same steps as in Example 1 except that a powder prepared by changing the $Tb_4O_7$ powder to a $Pr_6O_{11}$ powder as the absorber and mixing at the mass ratio shown in Table 1 was used.

Example 18

A ceramic article of Example 18 was obtained by the same steps as in Example 2 except that another aluminum component-containing liquid was used. The mass ratio of the weighed $SiO_2$ powder and $Tb_4O_7$ powder is shown in Table 1.

The aluminum component-containing liquid was prepared using alumina particles as follows. Alumina particles having an average particle diameter of 24 nm (manufactured by Kanto Chemical Co., Ltd.), 2-hydroxyethyl acrylate and 3-acryloxypropyltrimethoxysilane as dispersants, and methyl ethyl ketone as a solvent were mixed such that the concentration of alumina in the dispersion was 70 mass %, followed by uniform stirring to obtain an alumina particle dispersion.

Example 19

A ceramic article was produced as in Example 3 except that a SiO powder was used as the absorber at the mass ratio shown in Table 1. The SiO powder used had an average particle diameter of 5 μm.

Three silica-based structures of W 40 mm×D 4 mm×H 3 mm were produced for a three-point bending strength test, and one silica-based structure, which was the same as for the strength test, was produced for composition and structural evaluation.

The surface of the obtained silica-based structure was polished, and the crystal structure was analyzed by X-ray diffraction and EBSD. As a result, $SiO_2$ was cristobalite, and the rate thereof was 98 mass %.

Examples 20 and 21

Ceramic articles of Examples 20 and 21 were produced by the same steps as in Example 4 except that a $SiO_2$ powder, an $Al_2O_3$ powder, and a SiO powder as an absorber were weighed at the mass ratios shown in Table 1, a zirconium component-containing liquid was used as the metal component-containing liquid, and the heating treatment temperature was 1680° C. The $Al_2O_3$ powder used had an average particle diameter of 20 μm. As the zirconium component-containing liquid, a zirconium acetate aqueous solution prepared such that the zirconium content was 30 mass % was used.

In the ceramic articles of Examples excluding Example 15, the amount of B was small compared to that of the structure in Example 15, and the mechanical strengths were high, such as 5.0 MPa or more. In addition, the ceramic articles of Examples 15 and 16 were heated at 1600° C., a corner of the structure of Example 15 was slightly deformed. The heat resistance of Example 15 including a large amount of B was low compared to those of other Examples.

In the ceramic articles of Examples 1 to 16 and 18, $Si_2Tb_2O_7$ phases were observed. However, in the ceramic article of Example 17, a $Si_2Pr_2O_7$ phase was observed. Consequently, it is inferred that a phase-separated structure is formed in the structure to improve the mechanical strength. It is also assumed that such a structure prevents the temperature change of the coefficient of thermal expansion and also has an effect of easing the thermal stress.

In Examples 2 to 9 and 18 to 21 in which heating treatment was performed after absorption of a metal component-containing liquid, a further high strength was obtained by a decrease or extinguish of cracks and formation of an $Al_2O_3$ phase.

When the surfaces of the ceramic articles were observed with a microscope, in the ceramic articles of all Examples, the Ra of each structure surface measured while avoiding pores was 30 μm or less.

Comparative Example 1

As shown in Table 1, a ceramic article of Comparative Example 1 was produced as in Example 1 except that a powder in which the amount of the $Tb_4O_7$ powder to be mixed with the $SiO_2$ powder was increased to about 27.0 mass % and that the drawing pitch of the laser beam to be irradiated was set to 170 μm. The obtained ceramic article had a high porosity of 45.0% and a low three-point bending strength of 1.2 MPa.

Comparative Example 2

As shown in Table 1, when a ceramic article was molded as in Example 1 except that the mass ratio of the $Tb_4O_7$ powder in the powder used in molding was increased to about 27.0 mass %, the amount of $Tb_2Si_2O_7$ occupying the shaped object was increased. Si included in the ceramic article was 80 mass % or less in oxide conversion. The obtained ceramic article was put in 20 mL of a sodium hydroxide aqueous solution having a concentration of 20 mass % so that the amount of the shaped object of Comparative Example 2 was 0.1 g, the container was sealed, and a state of heating at 100° C. was held for 450 minutes. As a result, 0.02 g of the shaped object remained without being dissolved.

Accordingly, the ceramic article of Comparative Example 2 is recognized that the solubility in sodium hydroxide is insufficient for being used as a casting core.

Comparative Example 3

A ceramic article was produced as in Example 1 except that the temperature for heating after molding was 1440° C. When the crystal structure of the ceramic article was evaluated as in Example 1, the ceramic article was mostly amorphous silica, and the three-point bending strength evaluated as in Example 1 was a low value of 2.0 MPa.

Comparative Example 4

When a ceramic article was produced as in Example 1 except that the heating temperature after molding was 1740° C., a corner and an edge were dull and deformed.

In Comparative Example 4, it was inferred that since the shaped object was heat-treated in 1740° C., which is higher than the melting point (1730° C.) of silicon dioxide, the silicon dioxide became a liquid phase, and the shape could not be maintained.

According to the present invention, it is possible to provide a method for manufacturing a ceramic article using a silica-based material, while utilizing the characteristics of a direct molding system that can give a shaped object with a complicated shape and also capable of improving the mechanical strength of the shaped object. In addition, it is possible to provide a ceramic article having an improved mechanical strength while maintaining the shape accuracy.

Furthermore, the ceramic article of the present invention in which a sharp shape change due to thermal expansion is prevented can be used as a core for metal casting.

According to the present invention, a silica-based ceramic structure with a high molding accuracy and an excellent mechanical strength can be manufactured by using a direct molding system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method for manufacturing a ceramic article, comprising:
   a first step of forming a shaped object that contains silica, by at least repeating a step (i) and a step (ii),
   the step (i) being a step of disposing a powder that contains a plurality of components, and
   the step (ii) being a step of sintering or melting and solidifying the powder by irradiating the powder with a laser beam;
   a second step of removing an unsolidified powder around the shaped object, the unsolidified powder being disposed by repeating the step (ii); and
   a third step of performing, after the second step, a heating treatment of a maximum temperature $T_s$ at 1470° C. or more and less than 1730° C. to heat the shaped object,
   wherein the ceramic article has a phase-separated structure that includes a first phase and a second phase, the first phase contains an oxide of silicon, and the second phase contains an oxide of a metallic element,
   wherein the first phase and the second phase forms a eutectic with each other, and
   wherein a eutectic temperature $T_E$ of the eutectic, the maximum temperature $T_S$ of the heating treatment in the third step, a melting point $T_m$ of the oxide of silicon and a melting point $T_i$ of the oxide of the metallic element satisfy $T_E < T_S < T_m$ and $T_m < T_i$.

2. The method for manufacturing a ceramic article according to claim 1, wherein the powder contains a first component of the plurality of components more than a second component of the plurality of components.

3. The method for manufacturing a ceramic article according to claim 2, wherein the second component has an absorbing ability higher than that of the first component for light of a wavelength included in the laser beam.

4. The method for manufacturing a ceramic article according to claim 2, wherein an absorbing ability of the second component shows an absorption rate of 10% or more for light of a wavelength included in the laser beam.

5. The method for manufacturing a ceramic article according to claim 2, wherein the second component is $Tb_4O_7$ or $Pr_6O_{11}$.

6. The method for manufacturing a ceramic article according to claim 2, wherein the second component includes at least one selected from the group consisting of $Ti_2O_3$, $TiO$, $SiO$, $ZnO$, antimony-doped tin oxide (ATO), indium-doped tin oxide (ITO), $MnO$, $MnO_2$, $Mn_2O_3$, $Mn_3O_4$, $FeO$, $Fe_2O_3$, $Fe_3O_4$, $Cu_2O$, $CuO$, $Cr_2O_3$, $CrO_3$, $NiO$, $V_2O_3$, $VO_2$, $V_2O_5$, $V_2O_4$, $Co_3O_4$, and $CoO$.

7. The method for manufacturing a ceramic article according to claim 2, wherein the second component includes at least one selected from the group consisting of a carbide, a nitride, a boride, and a silicide.

8. The method for manufacturing a ceramic article according to claim 2, wherein the first component is silicon dioxide, the first component has an average particle diameter of 5 μm or more and 200 μm or less, and the second component has an average particle diameter of 1 μm or more and less than 10 μm.

9. The method for manufacturing a ceramic article according to claim 2, wherein the second component tis contained in the powder in an amount of 0.5 vol % or more and 10 vol % or less.

10. The method for manufacturing a ceramic article according to claim 2, wherein the second component of the plurality of components absorbs the laser beam in the step (ii).

11. The method for manufacturing a ceramic article according to claim 2, wherein a third component of the plurality of components is a metal compound, the third component being different from the second component.

12. The method for manufacturing a ceramic article according to claim 11, wherein the third component is aluminum oxide.

13. The method for manufacturing a ceramic article according to claim 2, wherein the second component is SiO.

14. The method for manufacturing a ceramic article according to claim 2, wherein the shaped object in the third step contains a metal component including the metallic element, the metal component being different from the second component.

15. The method for manufacturing a ceramic article according to claim 14, further comprising a process of allowing the shaped object to absorb a liquid containing the metallic element after the second step and before the heating treatment.

16. The method for manufacturing a ceramic article according to claim 14, wherein the metal component is an oxide of the metallic element.

17. The method for manufacturing a ceramic article according to claim 14, wherein the metal component generates the oxide of the metallic element by the heating treatment.

18. The method for manufacturing a ceramic article according to claim 14, wherein a content of the metal component in the powder is less than 3.0 mass %.

19. The method for manufacturing a ceramic article according to claim 1, wherein the ceramic article contains is-cristobalite.

20. The method for manufacturing a ceramic article according to claim 1, wherein a content of the oxide of silicon in the ceramic article is 55.7 wt % or more and 98.6 wt % or less.

21. The method for manufacturing a ceramic article according to claim 1, wherein the maximum temperature $T_S$ satisfies $T_S < T_m - (T_m - T_E)/2$.

22. The method for manufacturing a ceramic article according to claim 1, wherein the maximum temperature is 1610° C. or more.

23. The method for manufacturing a ceramic article according to claim 1, wherein a part of the silica in the shaped object melts by the heating treatment.

24. The method for manufacturing a ceramic article according to claim 1, wherein the metallic element is zirconium or aluminum.

25. The method for manufacturing a ceramic article according to claim 1, wherein the phase-separated structure includes a third phase, and the third phase contains a rare earth silicate.

26. A method for manufacturing a ceramic article, comprising:

a first step of forming a shaped object that contains silica, by at least repeating a step (i) and a step (ii), the step (i) being a step of disposing a powder that contains 5 $SiO_2$ and $Al_2O_3$, and the step (ii) being a step of sintering or melting and solidifying the powder by irradiating the powder with a laser beam;

a second step of removing an unsolidified powder around 10 the shaped object, the unsolidified powder being disposed by repeating the step (ii); and a third step of performing, after the second step, a heating treatment of a maximum temperature at 1595° C. or more and less than 1730° C. to heat the shaped object. 15

27. The method for manufacturing a ceramic article according to claim 26, wherein the powder contains less SiO than $SiO_2$.

28. The method for manufacturing a ceramic article according to claim 26, wherein the powder contains more 20 $SiO_2$ than $Al_2O_3$.

\* \* \* \* \*